(12) United States Patent
Knauer

(10) Patent No.: US 11,473,655 B2
(45) Date of Patent: Oct. 18, 2022

(54) TRANSMISSION ELEMENT FOR A MOTOR VEHICLE

(71) Applicant: MAGNA EXTERIORS (GERMANY) GMBH, Sulzbach (DE)

(72) Inventor: Bernd Knauer, Esslingen (DE)

(73) Assignee: Magna Exteriors (Germany) GmbH, Sulzbach (DE)

( * ) Notice: Subject to any disclaimer, the term of this patent is extended or adjusted under 35 U.S.C. 154(b) by 1332 days.

(21) Appl. No.: 13/916,995

(22) Filed: Jun. 13, 2013

(65) Prior Publication Data

US 2013/0333501 A1 Dec. 19, 2013

(30) Foreign Application Priority Data

Jun. 13, 2012 (DE) .......................... 102012011595.4

(51) Int. Cl.
| | | |
|---|---|---|
| F16H 21/44 | (2006.01) | |
| F16H 21/54 | (2006.01) | |
| F16H 25/18 | (2006.01) | |
| B60K 11/08 | (2006.01) | |

(52) U.S. Cl.
CPC ............ F16H 21/44 (2013.01); B60K 11/085 (2013.01); *Y02T 10/88* (2013.01); *Y10T 74/1892* (2015.01)

(58) Field of Classification Search
USPC ........... 74/89.2, 99 R, 105; 165/98, DIG. 97; 180/68.1, 68.3, 68.6; 296/180.5, 193.1
See application file for complete search history.

(56) References Cited

U.S. PATENT DOCUMENTS

| 1,699,020 | A | * | 1/1929 | Raleigh | 165/98 |
| 1,798,503 | A | * | 3/1931 | Stern | 180/68.1 |
| 4,715,421 | A | * | 12/1987 | Erber | 160/133 |
| 4,753,288 | A | * | 6/1988 | Harvey | 165/98 |
| 5,732,666 | A | * | 3/1998 | Lee | 123/41.05 |
| 7,866,737 | B2 | * | 1/2011 | Browne et al. | 296/193.1 |
| 8,181,727 | B2 | * | 5/2012 | Ritz et al. | 180/68.1 |
| 2012/0019025 | A1 | * | 1/2012 | Evans et al. | 296/193.1 |
| 2012/0119059 | A1 | * | 5/2012 | Crane et al. | 248/674 |
| 2012/0222833 | A1 | * | 9/2012 | Vikstrom et al. | 165/41 |

FOREIGN PATENT DOCUMENTS

| DE | 202005010683 U1 | 10/2005 |
| DE | 602004007338 T2 | 3/2008 |
| DE | 102007053531 A1 | 5/2009 |
| DE | 102008013422 A1 | 9/2009 |
| DE | 102008049010 A1 | 4/2010 |
| DE | 102008061054 A1 | 6/2010 |
| DE | 102009014003 A1 | 9/2010 |
| EP | 2233341 A1 | 9/2010 |
| EP | 2233342 A1 | 9/2010 |
| EP | 2325035 A1 | 5/2011 |
| EP | 2407333 A1 | 1/2012 |
| JP | S5968126 U | 5/1984 |

* cited by examiner

*Primary Examiner* — Jake Cook
(74) *Attorney, Agent, or Firm* — Jordan IP Law, LLC; Todd A. Vaughn

(57) ABSTRACT

A transmission element for a controllable air inlet of a motor vehicle and configured to produce a pivoting movement to pivotably mounted closing elements. Each closing element is connected by a link part which is arranged outside the pivot axis, to a corresponding link element of the transmission element (Ü).

6 Claims, 3 Drawing Sheets

US 11,473,655 B2

TRANSMISSION ELEMENT FOR A MOTOR VEHICLE

CROSS-REFERENCE TO RELATED APPLICATIONS

The present application claims priority under 35 U.S.C. § 119 to German Patent Application No. DE 10 2012 011 595.4 (filed on (Jun. 13, 2012), which is hereby incorporated by reference in its entirety.

TECHNICAL FIELD

A transmission element for a controllable air inlet of a motor vehicle.

BACKGROUND

In conventional motor vehicles, air flow to the heat exchanger is controlled by way of adjustable elements in order to enhance the warm-up behaviour of the engine. The adjustable elements, the closing elements, are generally a plurality of pivotably mounted slats, in which the pivot axes thereof are oriented in parallel or at an angle to one another, depending on the design of the radiator grille, and the slats in their entirety are arranged pivotably in a frame. The frame together with the arrangement of slats is arranged downstream of the radiator grille and upstream of the heat exchanger of the engine. By closing the supply of fresh air during the warm-up and by controlling the quantity of cooling air in accordance with the engine temperature, the optimum operating temperature is achieved more rapidly and can be kept within a confined temperature range.

EP 2 233 341 A1, EP 2 233 342 A1, EP 2 325 035 A1, DE 10 2008 049 010 A1, DE 20 2005 010 683 U1 and DE 60 2004 007 338 T2 show examples of the devices described.

The closing elements shown are designed as elongate sheet-like elements in the manner of a slat of substantially planar shape and are pivotable about an axis which generally passes centrally through the sheet-like element. In the known solutions, a plurality of pivotable closing slats is assigned to the opening through which the air is to pass.

DE 10 2009 014 003 A1 shows an example of an arrangement of this type. The controllable supply of air in this solution has two openings lying next to each other, wherein three closing slats which are pivotable about axes arranged parallel to one another are arranged in each opening. The planes of the two openings enclose an acute angle, i.e. the two openings do not lie in one plane. Accordingly, the pivot axes of the closing slats also extend with respect to each other in the two openings.

In the case of the device of EP 2 407 333 A1, a compression and thrust element is provided as the transmission element and serves to pivot a number of pivotably mounted closing elements. Each closing element is connected to a link part, arranged outside the pivot axis, of the transmission element.

DE 10 2007 053 531 A1 discloses a mechanism of switching off a supply of air in a vehicle, which mechanism is in the form of a roller shutter device. The individual closing elements, slats, are joined together to form a chain, a roller shutter, and are correspondingly connected to one another in an articulated manner and are guided in a guide. The roller shutter is driven by a shaft which has a chain wheel.

In order to adjust the closing slats in the two openings lying next to each other, an actuating element is provided as actuator, the actuating element jointly acting on the individual elements via a mechanism and thus bringing about an overall adjustment of the closing elements.

DE 20 2005 010 683 U1 discloses a slatted blind consisting of a number of slats which are assigned to an opening and which, actuated by an actuator, are pivoted. A linkage (not described specifically) or pull mechanism is specified as the transmission element of the actuating movement.

SUMMARY

Embodiments are directed to a transmission element having an enhanced design relative to conventional designs.

In accordance with embodiments, a transmission for a controllable air inlet of a motor vehicle includes at least one of: a transmission element configured to produce a pivoting movement to coupled and pivotably mounted closing elements, in which each closing element is connected by a link part which is arranged outside the pivot axis of the closing elements, to a link element of the transmission element, in which the transmission element has an elongate body configured to transmit tensile and shearing forces, and the link elements are arranged in a flexurally elastic manner in relation to the elongate body.

In accordance embodiments, a transmission element includes at least one of: a single transmission element composed of a molded plastic/polymer material, the transmission element having a plurality of individual transmission element bodies of semi-monocoque shape and, in flexurally elastic connection regions of the individual bodies, having link elements which are assigned to closing elements.

In accordance embodiments, a transmission element for an air inlet of a motor vehicle includes at least one of: a transmission element body having a first link configured for operative connection with a second link of a closing element of the air inlet in a manner permitting pivoting movement of the closing element, in which the second link is arranged outside of the pivot axis of the closing element.

In accordance embodiments, a transmission element for an air inlet of a motor vehicle includes at least one of: a plurality of transmission element bodies operatively connected to each other at a connection region via a tapering web; and a first link arranged between adjacent transmission element bodies at the connection region and configured for operative connection with a second link of a closing element of the air inlet in a manner permitting pivoting movement of the closing element.

In accordance embodiments, a transmission element for an air inlet of a motor vehicle includes at least one of: a plurality of transmission element bodies having a tapering web configured to permit operative connection of the transmission element bodies to adjacent transmission element bodies; and a first link between adjacent transmission element bodies and configured to operatively connect the transmission element with a closing element of the air inlet in a manner permitting pivoting movement of the closing element.

In accordance with embodiments, the individual closing elements each have a link pin which is oriented outside the pivot axis and parallel thereto and engages in a link element which is in the form of an eye, a pin receptacle of the transmission element. The link element, the pin receptacle, is arranged in the transition region of the bodies of semi-monocoque shape. Preferably, the bodies of semi-monocoque shape are connected to one another via one pair of webs in each case, and the pin receptacles are arranged in the transition region.

The transmission element in accordance with embodiments enables the actuating force of an actuator to be transmitted to a number of pivotably mounted closing elements in a manner which can be executed simply. For this purpose, the transmission element is arranged on one side of a frame supporting the closing slats and is mounted displaceably. The closing slats each have a pin which is arranged outside the pivot axis and engages in one link receptacle each of the transmission element. A displacement movement of the transmission element thus produces a common pivoting movement of the individual closing slats.

By way of the flexurally elastic arrangement of the link elements configured as pin receptacles, it is possible, with the transmission element in accordance with the invention, also to actuate closing slats where the pivot axes do not run parallel to one another.

In particular, it is possible, with a controllable supply of air to air supply openings lying next to each other, to actuate the closing slats assigned to the two openings with a centrally arranged transmission element. Accordingly, the transmission element has the flexurally elastic link elements on both sides in the form of the pin receptacles.

DRAWINGS

Embodiments are described by way of example below with reference to the drawings.

DESCRIPTION

Figure 1:
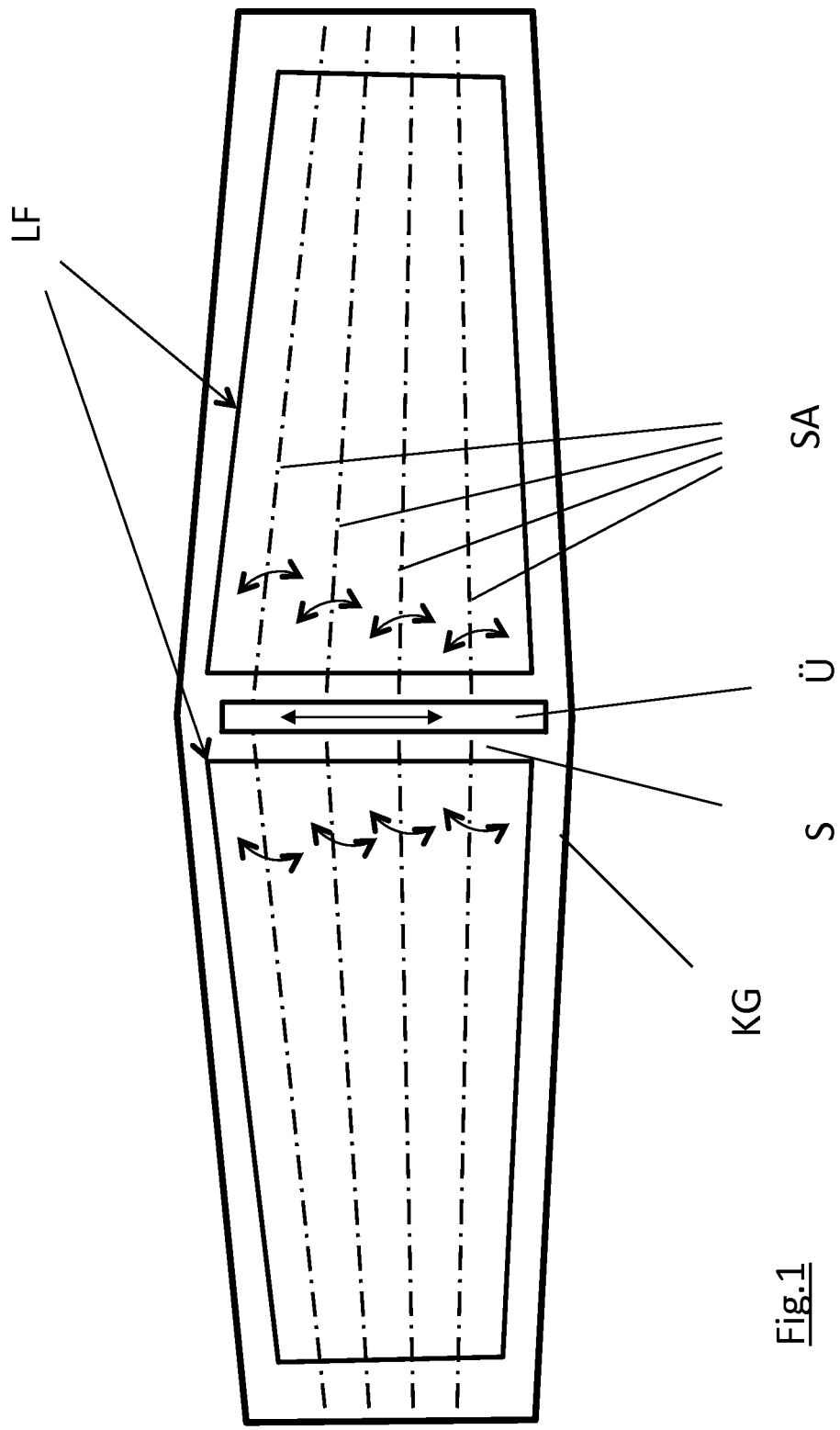
FIG. 1 illustrates a frame of a radiator grille with air passage openings, an in accordance with embodiments.
Figure 2:
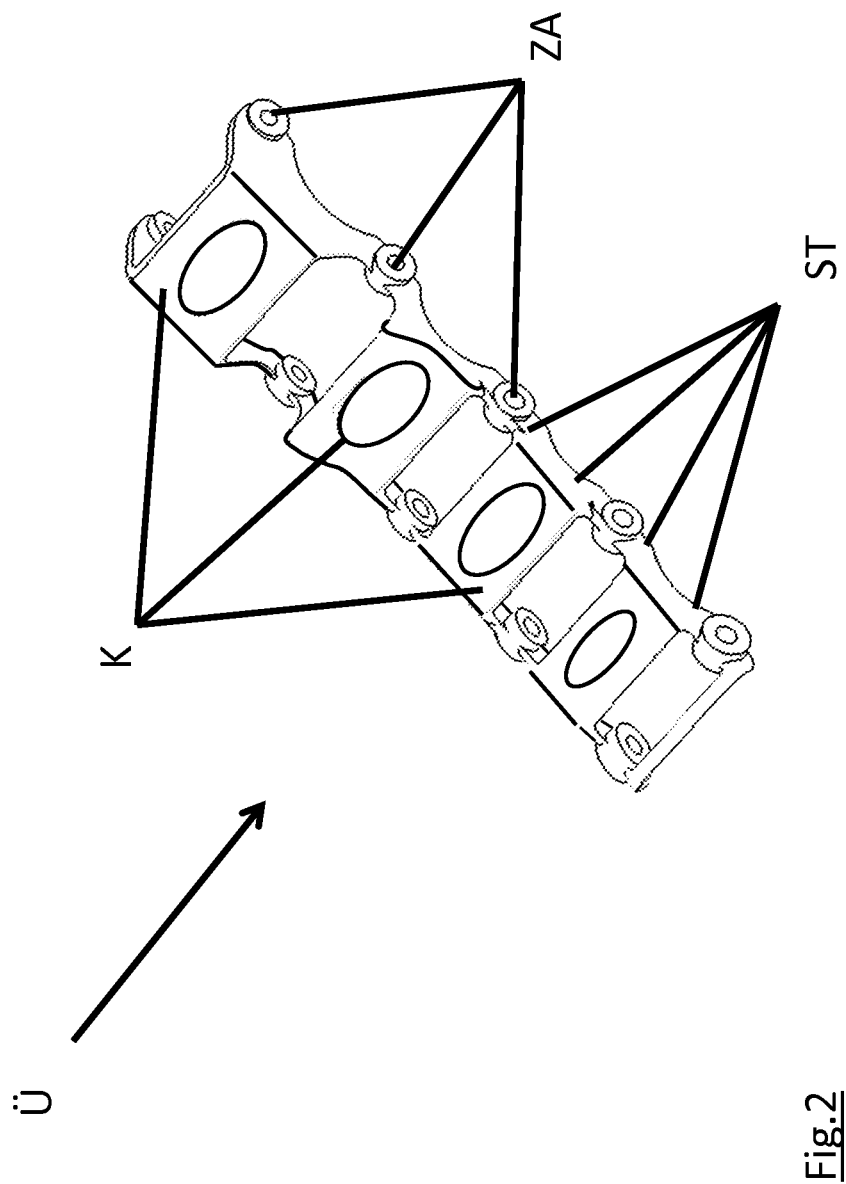
FIG. 2 illustrates a transmission element, in accordance with embodiments.

FIG. 1 illustrates a frame of a radiator grille KG having air passage openings LF. The air passage openings LF are assigned a plurality of closing elements in the form of slats SL each mounted about a pivot axis SA.

Each pivot axis SA in the air passage openings LF extends at an angle relative to other pivot axes. In particular, the pivot axes SA in the air passage openings LF do not lie in a common spatial plane. The air passage openings LF, the associated planes, may intersect at an angle in a direction of travel of the motor vehicle. In this case, the frame KG supporting the closing slats SL in a pivotably mounted manner is either arranged directly in the radiator grille of the vehicle on a side facing away from the design region of the radiator grille, or is arranged downstream in the bodywork itself.

Figure 3:
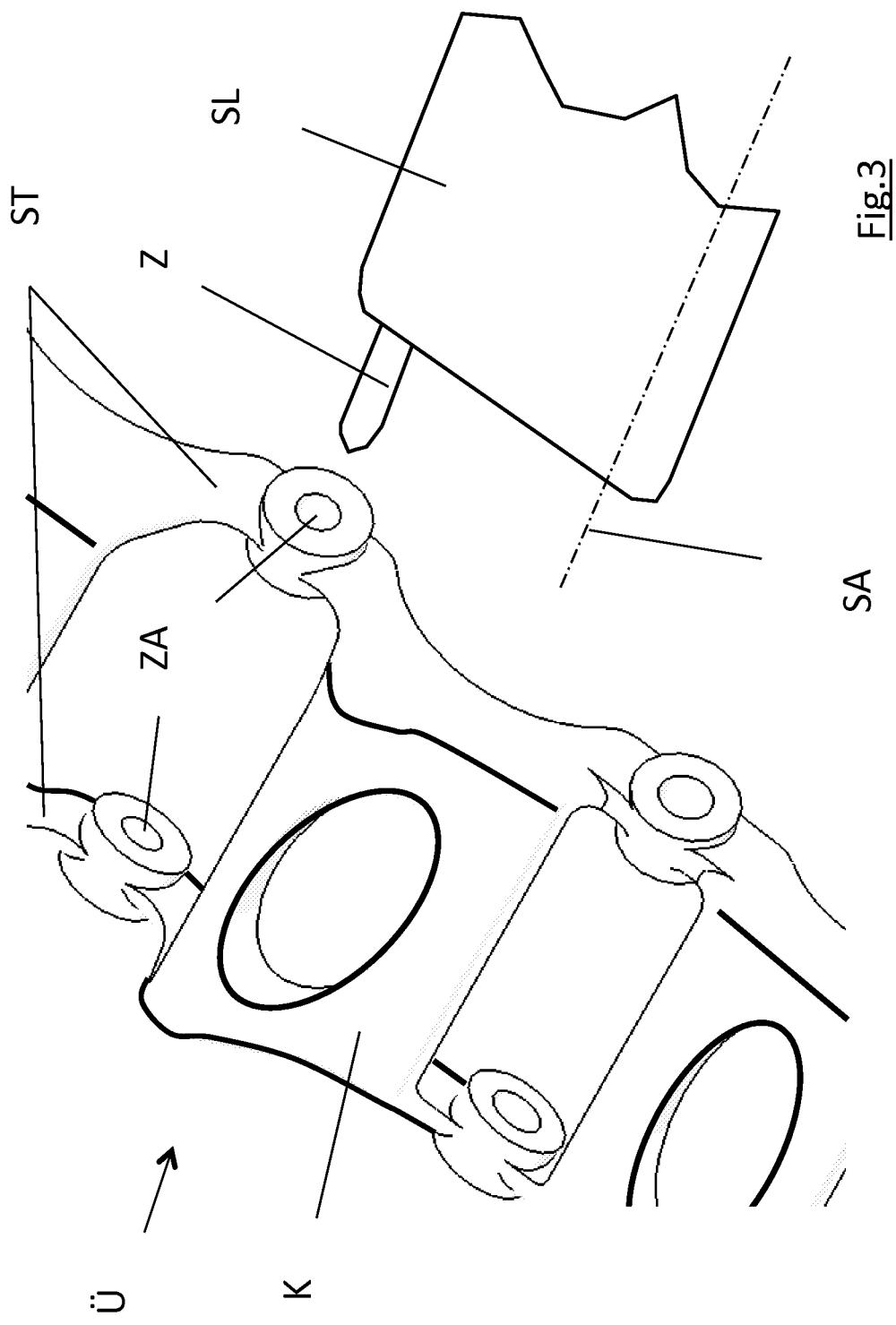
FIG. 3 illustrates a transmission and a slat of a radiator grill, in accordance with embodiments.

The centre of the frame of the radiator grille KG has a strut S which separates the air passage openings LF from each other. The corresponding ends of the slat SL are mounted pivotably in the strut S. A transmission element Ü is mounted displaceably in a direction of the extension of the strut S. As illustrated in FIG. 3, the transmission element Ü is connected to each of the closing slats SL via one pin Z in each case which is arranged outside the pivot axis SA and points in the direction of the transmission element.

The transmission element U may be manufactured as a single-piece plastic/polymer part and is structurally composed of individual bodies K of semi-monocoque shape or U-shape. The individual bodies K are operatively connected to one another by one pair of connecting webs ST in each case, in which the centre of each connecting web ST has a pin receptacle ZA as the link element. The webs ST of the associated body K are designed to taper in the direction of the pin receptacle ZA, and therefore, each pin receptacle ZA is mounted in a flexurally elastic manner in relation to the transmission element formed by the bodies K.

The transmission element Ü is adequately stiff in terms of compression and tension by way of the design thereof, but at the same time is also flexible in terms of torsion and bending. Therefore, the transmission element Ü can act in a displacing manner both in a rectilinear and in a curved direction, i.e. in particular on a strut S which, as illustrated in FIG. 1, extends in a curved manner in relation to the plane of the drawing. The individual pin receptacles ZA as link elements arranged between the bodies K enable adaptation corresponding to the flexural elasticity to closing slats SL (the pins Z thereof) which are also not mounted perpendicularly to the direction of extension of the transmission element Ü.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

KG Radiator grille, frame
LF Air passage opening
SA Pivot axis (closing element, closing slat, slat)
S Strut
Ü Transmission element
K Body (transmission element)
ST Web
ZA Pin receptacle
Z Pin (closing element, closing slat, slat)
SL Closing element, closing slat, slat

What is claimed is:

1. A transmission arrangement for a radiator grille of a motor vehicle, the radiator grille including a frame, a strut which separates air passage openings of the radiator grill from each other, and a controllable air inlet having at least one closing element mounted for pivoting movement about a pivot axis, the transmission arrangement comprising:
   a transmission element mounted to the strut for displaceable movement relative thereto in both a rectilinear and a curved direction which controls the pivoting movement of the at least one closing element, the transmission element comprising a single plastic component having at least one elongate transmission element body with a tapering web and a link member arranged at a connection region of the tapering web in a flexible elastic manner, the link member being connected to the at least one closing element via a pin member arranged outside the pivot axis of the at least one closing element in a manner permitting the pivoting movement of the at least one closing element during the displacement movement of the transmission element.

2. The transmission arrangement of claim 1, wherein the transmission element is mounted displaceably for movement in a direction of extension of the strut.

3. The transmission arrangement of claim 1, wherein the at least one elongate transmission element body is configured to transmit tensile forces and shearing forces.

4. The transmission arrangement of claim 1, wherein the link member comprises a receptacle configured to receive the pin member of the closing element.

5. A transmission element for controlling movement of an air inlet of a motor vehicle, the air inlet including at least one closing element mounted for pivoting movement about a pivot axis, the transmission element comprising:
   a transmission element body comprising a single plastic component having at least one elongate transmission element body with a tapering web and a link member arranged at a connection region of the tapering web in a flexible elastic manner, the link member being connected to the at least one closing element via a pin member arranged outside the pivot axis of the at least one closing element in a manner permitting the pivoting movement of the at least one closing element during the displacement movement of the transmission element.

6. A transmission element for controlling movement of an air inlet of a motor vehicle, the air inlet including at least one closing element mounted for pivoting movement about a pivot axis, the transmission element comprising:
   a transmission element body comprising a single plastic component having at least one elongate transmission element body with a web member and a link member arranged at a connection region of the web member in a flexible elastic manner, the link member comprising a pin receptacle to receive a pin member arranged outside the pivot axis of the at least one closing element in a manner permitting the pivoting movement of the at least one closing element during the displacement movement of the transmission element, wherein the web member is tapered in a direction of the pin receptacle.

* * * * *